(12) United States Patent
Kuroda

(10) Patent No.: US 9,050,666 B2
(45) Date of Patent: Jun. 9, 2015

(54) END MILL

(75) Inventor: Masahiko Kuroda, Kyoto (JP)

(73) Assignee: KYOCERA CORPORATION, Kyoto (JP)

( * ) Notice: Subject to any disclaimer, the term of this patent is extended or adjusted under 35 U.S.C. 154(b) by 149 days.

(21) Appl. No.: 13/699,831

(22) PCT Filed: May 27, 2011

(86) PCT No.: PCT/JP2011/062240
§ 371 (c)(1),
(2), (4) Date: Nov. 26, 2012

(87) PCT Pub. No.: WO2011/149062
PCT Pub. Date: Dec. 1, 2011

(65) Prior Publication Data
US 2013/0071192 A1    Mar. 21, 2013

(30) Foreign Application Priority Data

May 27, 2010    (JP) .................................. 2010-121713

(51) Int. Cl.
*B23C 5/10*    (2006.01)
*B23C 5/00*    (2006.01)

(52) U.S. Cl.
CPC .............. *B23C 5/10* (2013.01); *Y10T 407/1948* (2015.01); *B23C 2210/64* (2013.01); *B23C 5/1009* (2013.01); *B23C 2210/486* (2013.01)

(58) Field of Classification Search
CPC  B23B 51/02; B23B 2251/18; B23B 2251/44; B23B 2251/48; B23B 2251/406; B23B 2251/446; B23B 2251/443; B23C 5/10; B23C 5/1009; B23C 2210/64

USPC .......................................... 407/54, 60, 61, 53
See application file for complete search history.

(56) References Cited

U.S. PATENT DOCUMENTS

| 1,069,930 A | * | 8/1913 | Down | ............................ 408/223 |
| 2,646,701 A | * | 7/1953 | Letien | ............................. 408/56 |
| 5,160,232 A | * | 11/1992 | Maier | ........................... 408/223 |
| 5,873,683 A | * | 2/1999 | Krenzer | ......................... 408/230 |
| 6,164,879 A | * | 12/2000 | Krenzer | ......................... 408/224 |
| 7,905,688 B2 | * | 3/2011 | Ertl et al. | ......................... 407/42 |
| 8,215,206 B2 | * | 7/2012 | Kozak et al. | .................... 81/53.2 |

(Continued)

FOREIGN PATENT DOCUMENTS

| JP | 2-501207 A | 4/1990 |
| JP | 5-37411 U | 5/1993 |
| JP | 2005-125465 A | 5/2005 |

(Continued)

*Primary Examiner* — Will Fridie, Jr.
(74) *Attorney, Agent, or Firm* — Birch, Stewart, Kolasch & Birch, LLP

(57) ABSTRACT

The invention provides an end mill having an improved chip discharging performance and capable of carrying out excellent cutting machining. The end mill includes an end cutting edge (2) provided on a front end of a tool body (1) which rotates around a central axis, a peripheral cutting edge (4) provided on an outer periphery of the tool body (1), a rake surface of the end cutting edge (2) and the peripheral cutting edge (4), and at least one recess (6), which locally breaks the continuity of the end cutting edge (2) is provided, wherein a wall section (8) which extends toward the rear of the outer peripheral side is provided at least in that area of the rake surface (3) which is closer to the outer peripheral side than the recess (6).

7 Claims, 6 Drawing Sheets

(56) References Cited

U.S. PATENT DOCUMENTS 8,277,152 B2 * 10/2012 Azegami .................. 407/54
2012/0020749 A1 * 1/2012 Maeda et al. ............. 407/42

FOREIGN PATENT DOCUMENTS

| | | |
|---|---|---|
| JP | 2009-101460 A | 5/2009 |
| WO | WO 89/02328 A1 | 3/1989 |

* cited by examiner

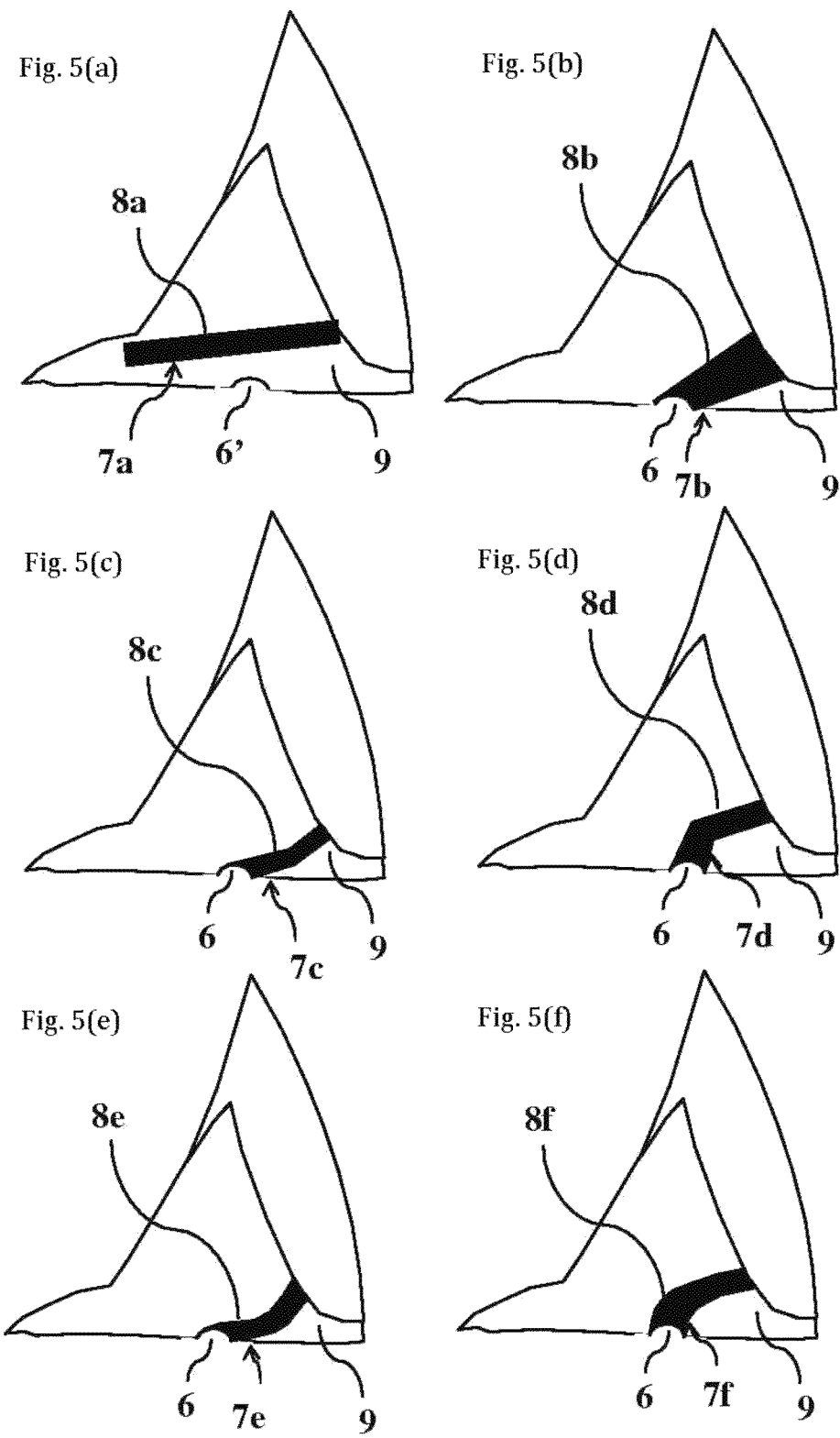

END MILL

TECHNICAL FIELD

The present invention relates to an end mill.

BACKGROUND ART

An end mill is mainly used when slot milling or counter boring is carried out.

JP 2005-125465 A discloses an end mill in which a step is provided on a rake surface of end cutting edge and peripheral cutting edge along the end cutting edge, and chip are pressed against the step and bent. It is also described in JP 2005-125465 A that a nick (recess) is formed in the end cutting edge.

JP 5-37411 Y also discloses that a nick (recess) is formed in an end cutting edge.

PRIOR ART DOCUMENTS

Patent Documents

Patent Document 1: JP 2005-125465 A
Patent Document 2: JP 05-37411 Y

SUMMARY OF THE INVENTION

Problem to be Solved by the Invention

However, JP 2005-125465 A and JP 5-37411 Y have a problem that chip produced on a more outer peripheral side than the nick are not easily curled and a discharging direction of the chip is instable, and chip existing on the outer peripheral side gets entangled with the end mill.

The present invention has been accomplished to solve the problem, and the invention provides an end mill capable of improving discharging performance of chip and capable of smoothly carrying out cutting machining.

Means for Solving the Problem

An end mill of the present invention includes an end cutting edge provided on a front end of a tool body which rotates around a central axis; a peripheral cutting edge provided on an outer periphery of the tool body; a rake surface of the end cutting edge and the peripheral cutting edge; and at least one recess which locally breaks the continuity of the end cutting edge is provided, and a wall section which extends toward the rear of the outer peripheral side is provided at least in that area of the rake surface which is closer to the outer peripheral side than the recess.

Effect of the Invention

According to the end mill of the present invention, chip produced when a workpiece is cut by the end cutting edge, the chip are finely divided by the recess, and when the chip are discharged out through the rake surface thereafter, chip passing through a vicinity of the central axis of the end mill are bent by a curved surface of the rake surface, chip passing through the outer peripheral side of the end mill are bent by a wall which functions as a breaker, and the chip are controlled such that the chip are discharged in a designated direction. Therefore, any of the chip are cut short and discharged, chip do not get entangled with the end mill and do not hinder the cutting machining, and satisfactory cutting machining can be performed.

BRIEF DESCRIPTION OF THE DRAWINGS

FIGS. 1 shows an example of an end mill of an embodiment, wherein

FIGS. 2 are enlarged side of a rake surface in an example of the end mill of the embodiment as viewed from a side surface of the end mill, wherein

FIGS. 3 are diagrams for explaining a producing state of chip in the end mill shown in FIGS. 2, wherein

FIGS. 4 are diagrams for explaining cutting machining states caused by difference of a discharging state of chip, wherein

FIGS. 5(a)-5(f) are diagrams for explaining modifications of the end mill of the embodiment.

MODE FOR CARRYING OUT THE INVENTION

An example of an end mill of an embodiment will be described using FIGS. 1 and 2(a).

Figure 1A:
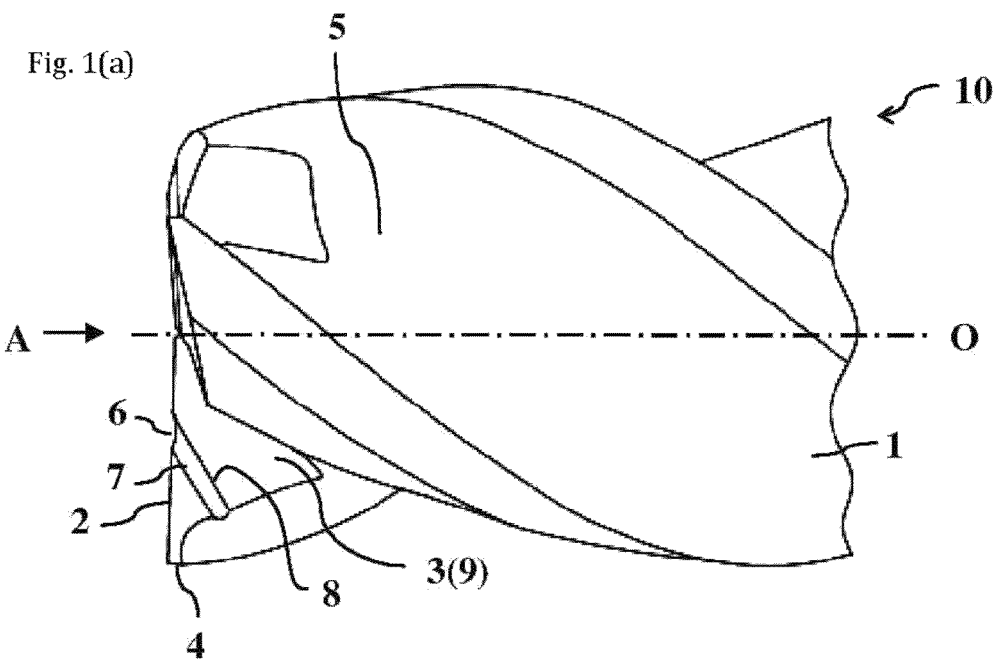
FIG. 1(a) is a side view and FIG. 1(b) is a front view as viewed from a front end (direction A).
Figure 1B:
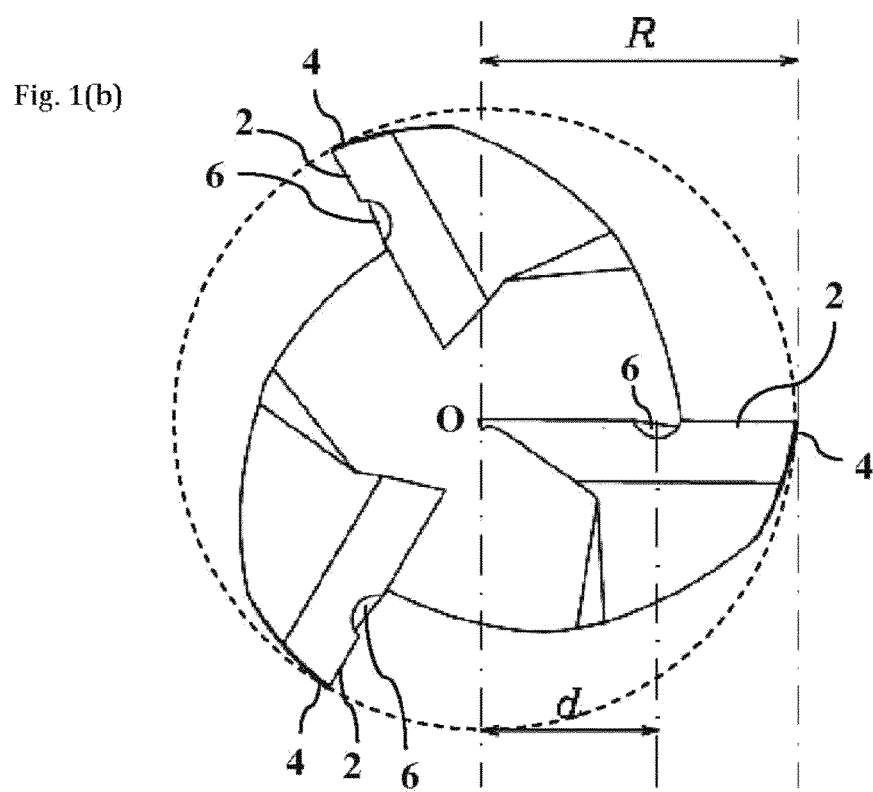

An end mill 10 shown in FIGS. 1(a) and 1(b) includes a plurality of end cutting edges 2 (three in FIG. 2) provided on a front end of a tool body 1 which rotates around a central axis O, peripheral cutting edges 4 respectively provided on outer peripheries of the end cutting edges 2, rake surfaces 3 of the end cutting edges 2 and the peripheral cutting edges 4, and recesses 6 which divide the end cutting edges 2. Wall sections 8 which extending toward the rear of the outer peripheral side, are provided on the rake surface 3 at locations closer to the outer peripheral side of the end mill than at least the recess 6. FIG. 1 show an example in which one of the recess 6, which is dented the paper plane.

The end mill 10 shown in FIG. 1 is provided with a chip discharging flute 5 which is linked with a rear portion of the rake surface 3. According to FIGS. 1(a) and 1(b), a concave gash 9 recessed in a front end view is formed by the rake surface 3 and the chip discharging flute 5 which are linked with the end cutting edge 2. The gash 9 acts as a chip pocket, thereby chip discharging performance will be maintained. Both chip cut by the end cutting edge 2 and chip cut by the peripheral cutting edge 4 flow toward the chip discharging flute 5 through the rake surface 3.

According to FIGS. 1(a) and 1(b), the wall section 8 is provided at a location closer to the outer periphery of the end mill than at least the recess 6 of the rake surface 3 such that the wall section 8 extends in a direction (angle θ from a plane perpendicular to the central axis O), between a rear direction p parallel to the central axis O and an outer peripheral direction q perpendicular to the central axis O. That is, the wall section 8 is located closer to the outer peripheral side, which is extended toward the rear. In other words, a rear end of the wall section 8 exists on the outer peripheral side with respect to the front end of the wall section 8. In FIGS. 1 and 2(a), the wall section 8 is formed from a wall surface of a flute portion 7 (breaker flute), functioning as a breaker which changes a flowing direction of chip, curls (bends) chip, and finely divide the chip. The wall section 8 extends from the recess 6 and forms one flute. This configuration is preferable because a discharging direction of chip can be made constant, chip can be discharged more stably, chip can easily be bent, and strength of the end cutting edge 2 can be maintained.

Figure 3A:
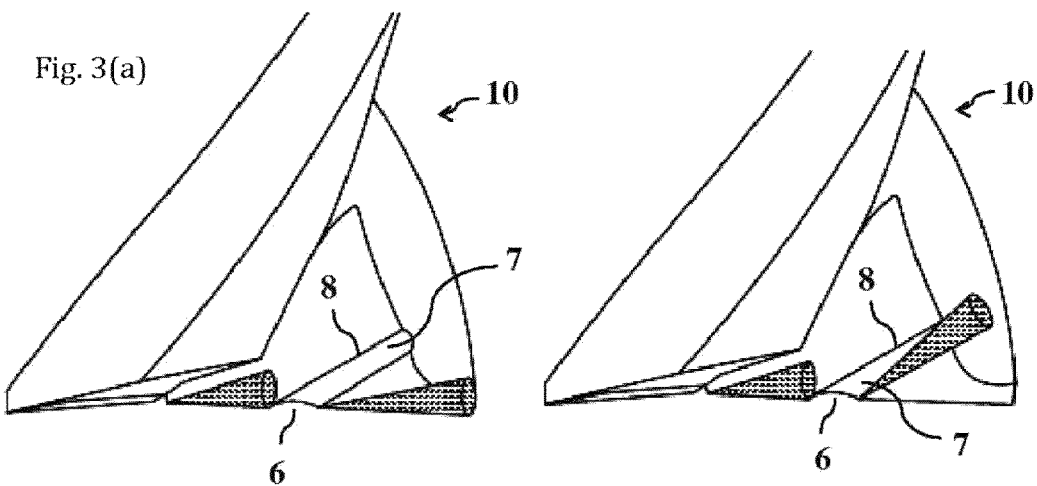
FIG. 3(a) shows an example of a configuration shown in FIGS. 1, and FIGS. 3(b) and 3(c) show configuration of comparative examples.
Figure 3B:
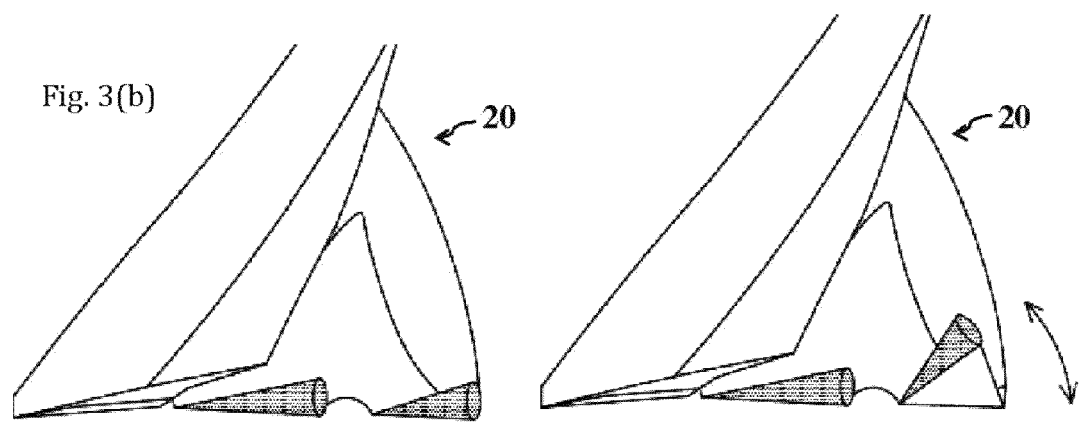
Figure 3C:
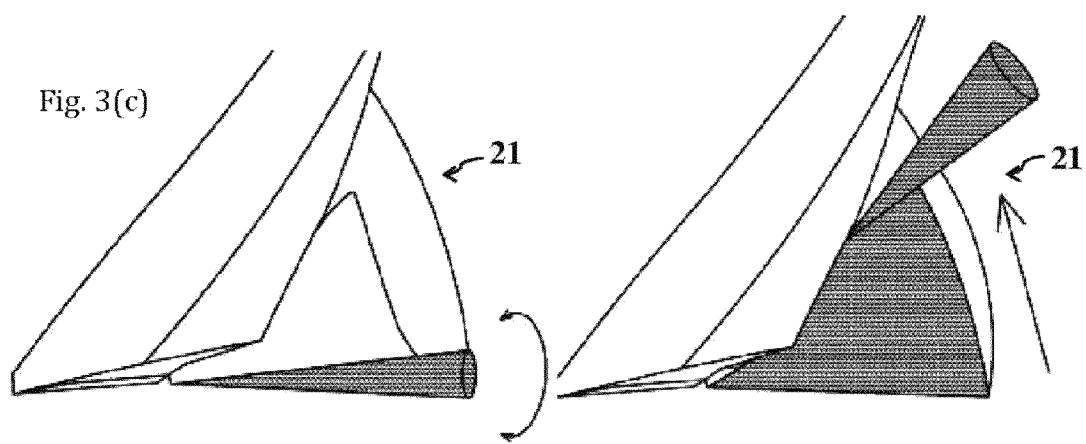
Figure 4A:
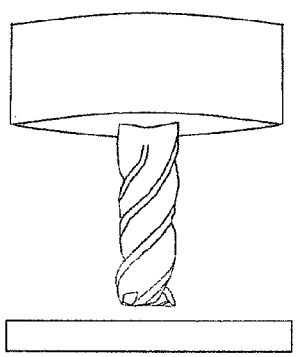
FIG. 4(a) shows the embodiment.
Figure 4B:
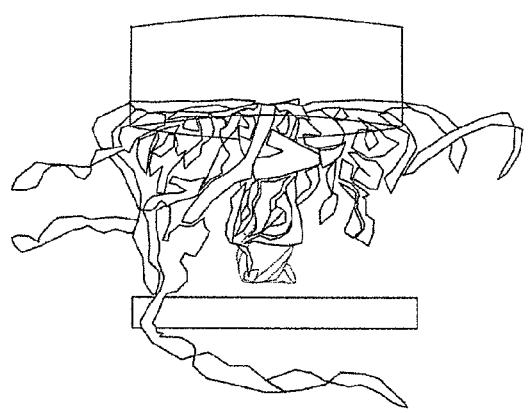
FIGS. 4(b) and 4(c) show a case where the end mill is used.
Figure 4C:
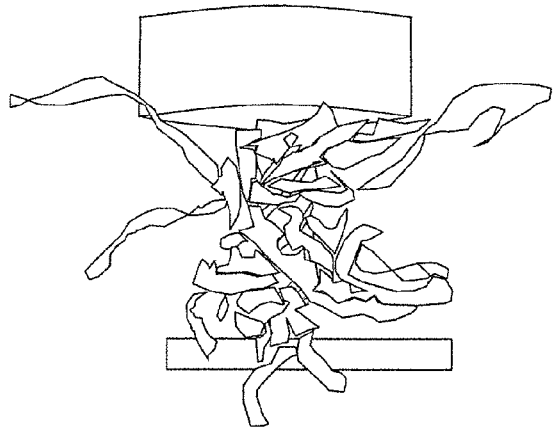

As shown in FIGS. 3 and 4, according to an end mill 21 shown in FIG. 3(c), chip having the same width as a radius of the end cutting edge are produced, but since a cutting amount per one rotation is greater at a location closer to an outer periphery of the end mill 21, chip are naturally curled and formed into conical shapes. Conically formed chip flow rearward along a shape of the chip discharging flute of the end mill 21 but since the chip have large widths and protrude outward than a space of the chip discharging flute, the end mill 21 advances toward a front end, and when plunge milling (drilling) is carried out, chip is caught on the tool body 1 or a workpiece and chip do not flow rearward, and the hole is clogged with chip as shown in FIG. 4(c). According to an end mill 20 in which only a nick (recess) is formed shown in FIG. 3(b), although a plurality of chip having small widths are produced, since the rake surface 3 is relatively flat in shape, chip generated at a location closer to an outer periphery of the end mill have flexibility in their advancing directions, and chip are discharged in random directions. The chip discharged in the random directions get entangled with a body of the end mill 20 as shown in FIG. 4(b) in some cases.

On the other hand, according to a configuration shown in FIG. 3(a), since chip produced when a workpiece is cut by the end cutting edge 2 are finely divided by the recess 6, the chip do not protrude from the chip discharging flute 5, chip generated at a location closer to the outer periphery than the recess 6 are also easily bent by the wall section 8, a discharging direction of chip is made constant, and chip can stably be discharged as shown in FIG. 4(a).

Figure 2A:
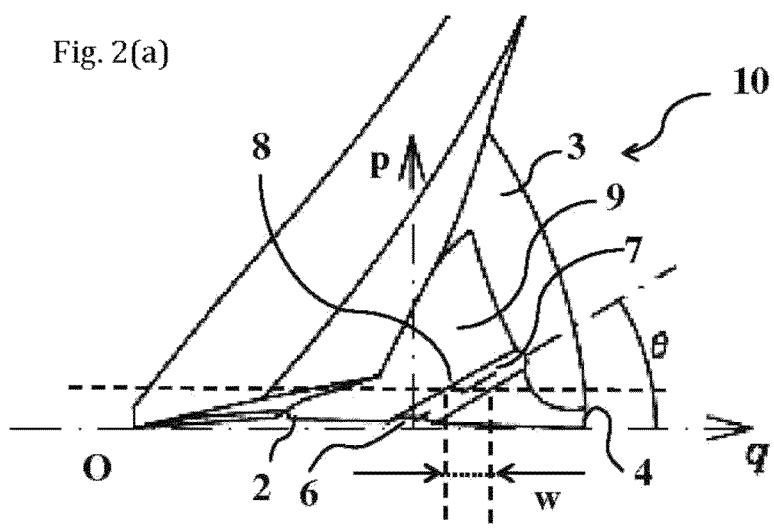
FIG. 2(a) shows an example of a configuration shown in FIGS. 1, and FIGS. 2(b) and 2(c) show configuration of comparative examples.

In FIGS. 1 and 2(a), the flute portion 7 extends from the recess 6. That is, the recess 6 and the flute portion 7 are connected to each other, and since the flute portion 7 extends rearward on the outer peripheral side, the rake surface 3 exists between the end cutting edge 2 and the flute portion 7 at a location on the outer peripheral side of the flute portion 7. According to this configuration, it is easy to manufacture the end mill and chip can easily be bent, but according to this embodiment, a flute portion 7a and a recess 6' in which a cross ridge of the end cutting edge 2 is dented toward a back side of the paper sheet behind the central axis O may independently exist without connecting the recess 6 and the flute portion 7 to each other as shown in FIG. 5(a). In this case also, the flute portion 7a extends rearward on the outer peripheral side, and the rake surface 3 exists between the flute portion 7a and the end cutting edge 2.

Figure 2B:
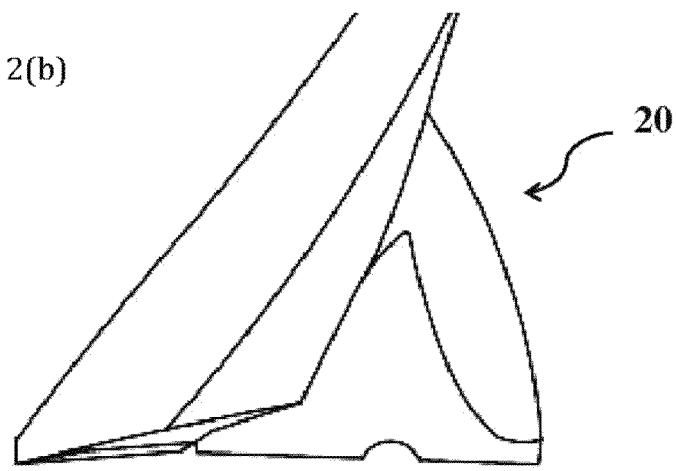
Figure 2C:
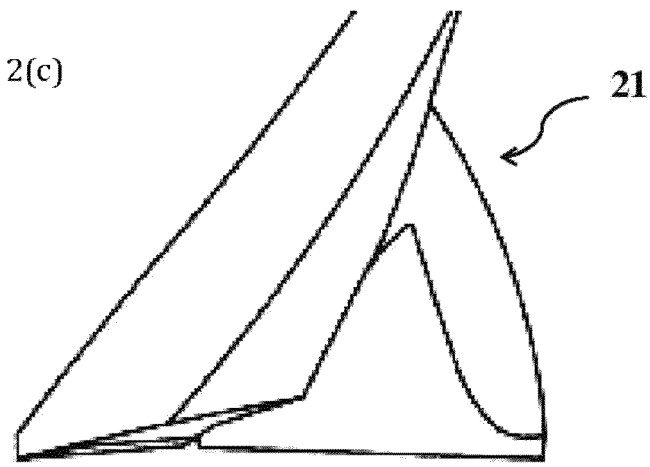

As shown in FIGS. 1 to 3, it is preferable that the flute portion 7 is a band-like shape having a constant width w in a direction perpendicular to the central axis O, since it is easy to bend chip and strengths of the end cutting edge 2 and the peripheral cutting edge 4 can be maintained. In view of the producing state of the chip, a flute portion 7b can be formed wide in width in the direction of the central axis O on the outer peripheral side as shown in FIG. 5(b). The flute portion 7 and a wall section 8 are not limited to straight shapes, and they may have shapes, which are bent or curved in mid-course like flute portions 7c to 7f and wall sections 8c to 8f shown in FIGS. 5(c) to 5(f).

Here, it is preferable that the width w of the band-like flute portion 7 in the direction perpendicular to the central axis O, is in a range of 3 to 15% of the greatest outer diameter R of a rotation locus of the end cutting edge 2 from the central axis O, since the discharging performance of chip can be more improved and strengths of the end cutting edge 2 and the peripheral cutting edge 4 can be maintained. The width w of the band-like flute portion 7 is measured at its intermediate position.

It is preferable that the flute portion 7 has a flute shape including a downwardly inclining wall surface and a rising wall surface (wall section 8) because a discharging direction of chip can be made constant and chip can more stably be discharged. A depth of the flute is determined while taking the width of the flute portion 7 and an expected amount of chip to be produced into consideration. Although the flute portion 7 is indicated as an example configuring the wall section 8, the wall section 8 is not limited to the flute, and the wall section 8 may have a projecting shape (not shown) including a projecting wall surface and a lowering wall surface.

It is possible to form a plurality of recess 6, but it is preferable that only one recess 6 exists with respect to one end cutting edge 2 as shown in FIGS. 1 and 2(a) because it is possible to restrain the end cutting edge 2 from becoming chipped. It is preferable that the recess 2 is formed at a position of 50% to 90% of a diameter of a rotation locus from the central axis O of the end cutting edge 2, i.e., it is preferable that the recess 6 is formed such that a ratio (d/R) of a distance d from the central axis O of the end cutting edge 2 of the recess 6 and a diameter R of the rotation locus from the central axis O of the end cutting edge 2 is in a range of 0.5 to 0.9, because it is possible to reduce chipping of the peripheral cutting edge 4 which easily becomes chipped, and to optimize the chip discharging performance. A further preferable range of the radio (d/R) is 0.6 to 0.8. It is preferable that the angle θ between the flute portion 7 and the direction q perpendicular to the central axis O is in a range of 40 to 80° because chip produced on the outer peripheral side are smoothly discharged.

Figure 6A:
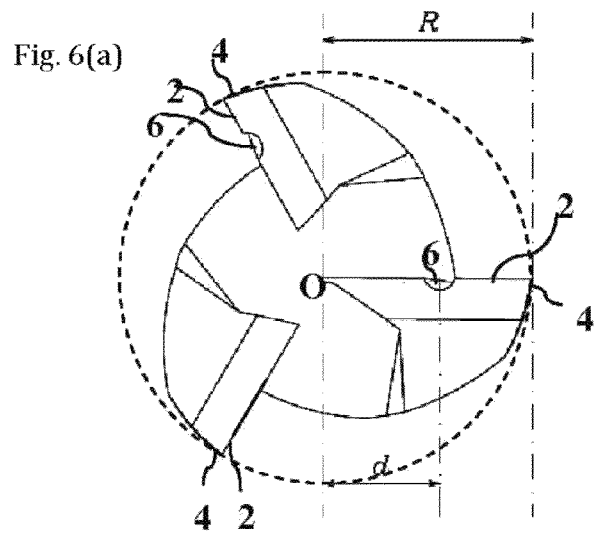
FIGS. 6(a)-6(c) are diagrams for explaining other modifications of the end mill of the embodiment.
Figure 6B:
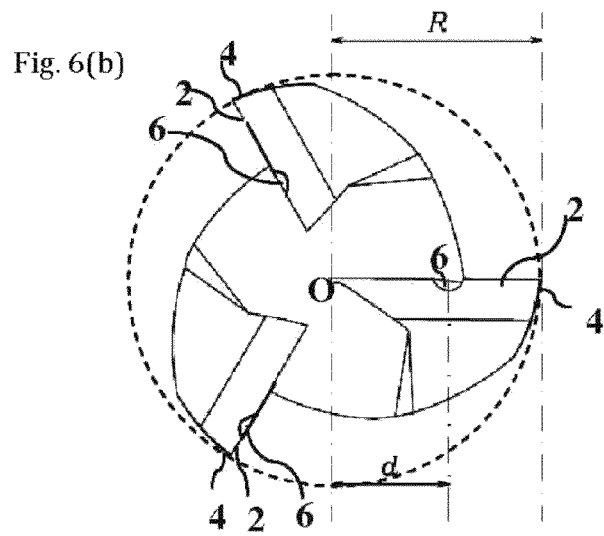
Figure 6C:
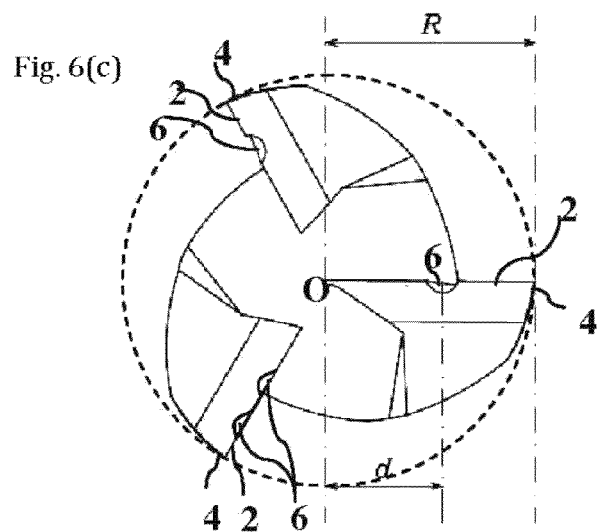

When a plurality of end cutting edges 2 are provided, at least one of the number of recess 6 formed for at least one of the plurality of end cutting edges 2, a position and a shape of the recess 6 in the cross ridge forming the end cutting edge 2 may be different. For example, the recess 6 may be formed for each of all end cutting edges 2 as shown in FIG. 1(b), the recess 6 may be formed for some of the end cutting edges 2 as shown in FIG. 6(a), positions of the recess 6 may be changed for the respective end cutting edges 2, and the number of recess 6 may be changed for respective end cutting edges 2. If asymmetric recess 6 having different specifications are formed for the end cutting edges 2, it is possible to suppress a case where the end mill 10 produces resonance when cutting machining is carried out and chatter vibration is generated. If the recess 6 are deviated in positions, it is possible to avoid a case where an uncut portion of a bottom surface of a workpiece remains.

When a plurality of peripheral cutting edges 4 are provided, as a method capable of suppressing a case where the end mill 10 produces resonance when cutting machining is carried out and chatter vibration is generated, at least one of a shape and a direction of the flute portion 7 is made different in at least one of the plurality of peripheral cutting edges 4.

Although the configuration of a so-called solid end mill type in which the cutting edges are formed at predetermined portions of the tool body 1 itself as shown in FIG. 1 is described in the embodiment, alternatively, it is possible to employ a so-called throw away end mill type configuration in which a so-called throw away chip is mounted on a holder.

DESCRIPTION OF SYMBOLS

1: tool body
2: end cutting edge

3: rake surface
4: peripheral cutting edge
5: chip discharging flute
6: recess
7: flute portion
8: wall section
9: gash
10, 20, 21: end mill
A: front end direction
O: central axis
p: rear end direction
q: direction of outer periphery
R: diameter of rotation locus from central axis of end cutting edge
w: width of band-like flute portion, in a direction perpendicular to central axis (parallel to end cutting edge)
d: distance from central axis of end cutting edge to recess
θ: inclination angle formed between wall surface of flute portion and direction q, perpendicular to central axis

The invention claimed is:

1. An end mill comprising: an end cutting edge provided on a front end of a tool body which rotates around a central axis; a peripheral cutting edge provided on an outer periphery of the tool body; a rake surface of the end cutting edge and the peripheral cutting edge; and at least one recess which locally breaks the continuity of the end cutting edge is provided, wherein a wall section which extends so as to become closer to the outer periphery in relation to the position of the wall section as the wall section nears a rear of the tool body is provided at least in that area of the rake surface which is closer to the outer peripheral side than the recess, and wherein the wall section extends from the recess to reach the outer periphery in a direction between a rear direction parallel to the central axis and an outer peripheral direction perpendicular to the central axis.

2. The end mill according to claim 1, wherein the wall section is a wall surface of a flute portion.

3. The end mill according to claim 2, wherein a width of the flute portion in a direction perpendicular to the central axis is 3 to 15% of a diameter of a rotation locus of the end cutting edge with respect to the central axis.

4. The end mill according to claim 1, wherein only one recess exists with respect to one of the end cutting edge, and the recess is provided at such a position that a distance from the central axis is 50% to 90% of a diameter of a rotation locus of the end cutting edge with respect to the central axis.

5. The end mill according to claim 1, further comprising a plurality of end cutting edges wherein at least one of the number of the recesses, a formed position and a shape of the recesses in a cross ridge forming the end cutting edge is different with respect to at least one of the plurality of end cutting edges.

6. The end mill according to claim 2, further comprising a plurality of peripheral cutting edges, wherein at least one of a shape and a direction of the flute portion is different in at least one of the plurality of peripheral cutting edges.

7. The end mill according to claim 1, wherein an angle between the wall section and a direction perpendicular to the central axis is 40 to 80°.

* * * * *